(12) United States Patent
Ma et al.

(10) Patent No.: US 12,475,988 B2
(45) Date of Patent: Nov. 18, 2025

(54) FEEDBACK CONTROL SYSTEM FOR CRYO-MAPPING AND CRYOABLATION

(71) Applicant: Medtronic CryoCath LP, Toronto (CA)

(72) Inventors: Wing-Choi Ma, Maple Grove, MN (US); Bertin Simeon, Laval (CA); Timothy A. Ebeling, Circle Pines, MN (US); Gary P. Kivi, Maple Grove, MN (US)

(73) Assignee: Medtronic CryoCath LP, Toronto (CA)

( * ) Notice: Subject to any disclaimer, the term of this patent is extended or adjusted under 35 U.S.C. 154(b) by 840 days.

(21) Appl. No.: 17/662,409

(22) Filed: May 6, 2022

(65) Prior Publication Data

US 2022/0359056 A1  Nov. 10, 2022

Related U.S. Application Data

(60) Provisional application No. 63/186,397, filed on May 10, 2021.

(51) Int. Cl.
*A61B 18/02* (2006.01)
*G16H 20/40* (2018.01)

(52) U.S. Cl.
CPC ............ *G16H 20/40* (2018.01); *A61B 18/02* (2013.01)

(58) Field of Classification Search
CPC ............ A61B 18/02; A61B 2018/0022; A61B 2018/00345; A61B 2018/00577;
(Continued)

(56) References Cited

U.S. PATENT DOCUMENTS 6,468,268 B1 * 10/2002 Abboud ................. A61B 18/02
606/22
9,314,644 B2     4/2016 Wu et al.
(Continued)

FOREIGN PATENT DOCUMENTS

| CN | 112263321 A | 1/2021 |
| EP | 3505103 A1 | 7/2019 |
| NO | 2021027682 A1 | 2/2021 |

OTHER PUBLICATIONS

International Search Report and Written Opinion for Application No. PCT/CA2022/050723 dated Aug. 15, 2022 (11 pages).
(Continued)

*Primary Examiner* — Khadijeh A Vahdat
(74) *Attorney, Agent, or Firm* — Michael Best & Friedrich LLP

(57) ABSTRACT

A method and system for feedback control for cryo-mapping and cryoablation are disclosed. According to one aspect, a cryo-mapping and cryoablation control system includes a first control device configured to receive a target parameter value and a measured output parameter and to output an injection pressure target signal based on a first difference between the target parameter value and the measured output parameter. The system also includes a second control device configured to receive the injection pressure target signal and to output a valve control signal, the valve control signal being used to set a position of an injection pressure valve. The first control device is configured to determine a value of the injection pressure target signal to drive the first difference toward zero.

20 Claims, 7 Drawing Sheets

(58) Field of Classification Search
CPC .......... A61B 2018/00642; A61B 2018/00744;
A61B 2018/00791; A61B 2018/00863;
A61B 2018/0212; A61B 2018/0262
See application file for complete search history.

(56) References Cited

U.S. PATENT DOCUMENTS

2003/0135252 A1    7/2003  Machold et al.
2014/0276698 A1*  9/2014  Wittenberger ..... A61B 18/1492
606/21
2022/0287757 A1*  9/2022  Gong .................... A61B 18/02

OTHER PUBLICATIONS

European Patent Office Extended Search Report for Application No. 22806148.7 dated Feb. 14, 2025 (10 pages).

* cited by examiner

FEEDBACK CONTROL SYSTEM FOR CRYO-MAPPING AND CRYOABLATION

CROSS-REFERENCE TO RELATED APPLICATION

The present application is related to and claims benefit under 35 U.S.C. § 119(e) from U.S. Provisional Patent Application Ser. No. 63/186,397, filed 10 May 2021, entitled "FEEDBACK CONTROL SYSTEM FOR CRYOMAPPING AND CRYOABLATION," the entire contents of which being incorporated herein by reference.

FIELD

The present technology is generally related to feedback control systems for cryo-mapping and cryoablation.

BACKGROUND

Medical procedures are available for treating a variety of cardiovascular maladies, such as cardiac arrhythmias including atrial fibrillation, and other irregularities in the transmission of electrical impulses through the heart. As an alternative to open-heart surgery, many medical procedures are performed using minimally invasive surgical techniques, where one or more slender implements are inserted through one or more small incisions into a patient's body. Such procedures may involve the use of catheters or probes having multiple sensors, electrodes, or other measurement and treatment components to treat the diseased area of the heart, vasculature, or other tissue. Minimally-invasive devices are desirable for various medical and surgical applications because they allow for precise treatment of localized discrete tissues that are otherwise difficult to access. For example, catheters may be easily inserted and navigated through the blood vessels and arteries, allowing non-invasive percutaneous access to areas of the body selected for treatment.

One such example of a minimally invasive therapy involves the treatment of cardiac arrhythmias or irregular heartbeats in which physicians employ specialized cardiac assessment and treatment devices, for example, mapping catheters and ablation catheters, to gain access to, diagnose, and treat interior regions of a patient's body. Such devices may include energized electrodes or other ablation assemblies to create lesions or other anatomical effects that disrupt or block electrical pathways through the targeted tissue.

In the treatment of cardiac arrhythmias, a specific area of cardiac tissue having aberrant electrically conductive pathways is typically initially identified for subsequent treatment. This localization or identification can include first using a medical device, for example, a mapping catheter, to obtain a baseline electrophysiological map of electrical activity in selected tissue. After mapping and diagnosing aberrant tissue, a physician may decide to treat the patient by ablating the tissue. An ablation procedure may involve creating one or more lesions to electrically isolate tissue believed to be the source of an arrhythmia. One type of ablation is cryoablation, which entails creating cold temperatures at specific regions of the body or contacting tissue with cold treatment devices to transfer heat from the targeted tissue to the cryogenic element, thus cooling and/or ablating the tissue.

FIG. 1 shows one example of a conventional cryogenic catheter device 10 that functions to map and treat tissue. The cryogenic catheter device 10 includes a handle 12, an elongated body 14 having a proximal end 16 and a distal end 18 which defines a fluid flow path. The cryogenic catheter device 10 may include an expandable member 20 coupled to the elongated body 14. The elongated body 14 is a flexible tube that couples fluid from a fluid source to the expandable member 20 and the distal end 18. In particular, cold fluid may be injected into a first cooling injection umbilical within the elongated body 14 to inflate the expandable member 20. A vacuum umbilical within the elongated body 14 may evacuate the injected fluid to deflate the expandable member 20.

The expandable member 20 has disposed thereon, electrodes 22. When fluid is injected into the expandable member 20 via the elongated body 14, the expandable member 20 expands, causing the electrodes 22 to contact surrounding tissue and sense electrical activity in the tissue in the vicinity of the electrodes 22. The electrical activity sensed by the electrodes 22 are conducted by wires to equipment that records and displays the electrical activity. Such equipment may include an electrocardiograph (ECG), a computer with a keyboard, mouse and video monitor. The signals that are displayed on the video monitor may assist the surgeon in determining, among other things, an amount of electrical activity of the tissue and how well the expandable member is making contact with the surrounding tissue and whether the ablation in a current position is likely to succeed or whether the expandable member 20 should be repositioned and a new mapping obtained.

In addition to, or in the alternative to the expandable member 20, the distal end 18 of the elongated body 14 may be equipped with a thermal tip 24 that removes heat from the tissue to reach a first temperature for cryo-mapping and to reach a second temperature that ablates the tissue. The target temperature for the thermal tip 24 is higher for cryo-mapping than for cryoablation, so that for cryo-mapping the cellular effects are reversible and for cryoablation the cellular effects are irreversible. In operation, the thermal tip 24 may fluctuate in temperature. Also, the injection pressure of the fluid (for example, $N_2O$) may also fluctuate. These fluctuations are generally undesirable during a time of mapping or ablation.

SUMMARY

The techniques of this disclosure generally relate to feedback control systems for cryo-mapping and cryoablation. In some embodiments, the flow rate of fluid mass and/or the temperature of the thermal tip of a cryo-catheter is controlled by a closed feedback control loop.

In one aspect, the present disclosure provides a method of controlling an output parameter in a cryoablation and cryo-mapping system, the output parameter being one of temperature and mass flow rate. The method includes inputting a target parameter value to a first control device, the first control device configured to output an injection pressure target signal based on a first difference between the target parameter value and a measured value of the output parameter. The method also includes inputting the injection pressure target signal to a second control device, the second control device configured to output a valve control signal. The method further includes setting a position of an injection pressure valve based on the valve control signal. The method also includes measuring the output parameter to obtain the measured value of the output parameter and determining a value of the injection pressure target signal to drive the first difference toward zero.

According to this aspect, in some embodiments, the second control device is configured to drive a second difference between the injection pressure target signal and a measured injection pressure toward zero. In some embodiments, the first control device is implemented using a proportional integral derivative (PID) device having parallel branches, each branch configured to determine a term of a relationship between the first difference and the injection pressure target signal. In some embodiments, the second control device is implemented using a proportional integral derivative (PID) device having parallel branches, each branch configured to determine a term of a relationship between the second difference and the valve control signal. In some embodiments, the method further includes incrementing or decrementing the target parameter value during a transition period between inputting a first target parameter value and a second target parameter value, the incrementing or decrementing being according to a variable step size. In some embodiments, the method further includes ceasing incrementing or decrementing the target parameter value when the valve control signal reaches a maximum or minimum, respectively. In some embodiments, the method further includes inputting an initial injection pressure target signal determined to control an amount of overshoot of the valve control signal.

According to another aspect, a cryoablation and cryo-mapping system configured to control an output parameter of a cryo-delivery system is provided, where the output parameter is one of temperature and mass flow rate. The system includes a first control device configured to receive a target parameter value and a measured output parameter and to output an injection pressure target signal based on a first difference between the target parameter value and the measured output parameter. The system also includes a second control device configured to receive the injection pressure target signal and to output a valve control signal, the valve control signal being input to a proportional valve. The first control device determines a value of the injection pressure target signal to drive the first difference toward zero.

According to this aspect, in some embodiments, the second control device is configured to drive a second difference between the injection pressure target signal and a measured injection pressure toward zero. In some embodiments, the first control device is implemented using a proportional integral derivative (PID) device having parallel branches, each branch configured to determine a term of a relationship between the first difference and the injection pressure target signal. In some embodiments, the second control device is implemented using a proportional integral derivative (PID) device having parallel branches, each branch configured to determine a term of a relationship between the second difference and the valve control signal. In some embodiments, the system further includes processing circuitry configured to increment or decrement the target parameter value during a transition period between inputting a first target parameter value and a second target parameter value, the incrementing or decrementing being according to a variable step size. In some embodiments, the system further includes a cryogenic catheter device configured to receive fluid from the cryo-delivery system through the injection pressure valve. In some embodiments, the cryogenic catheter device has a thermal tip configured to sense a temperature of tissue contacted by the thermal tip. In some embodiments, the system also includes a user interface to display a thermal temperature map based on the temperature sensed by the thermal tip. In some embodiments, the system also includes processing circuitry configured to disconnect the injection pressure target signal output of the first control device from an input of the second control device, and to input an initial injection pressure target signal to the second control device during an initialization period. In some embodiments, the processing circuitry is further configured to reconnect the injection pressure target signal output of the first control device to the input of the second control device.

According to yet another aspect, a controller is configured to control an output parameter of a cryo-delivery system, where the cryo-delivery system is configured to inject a fluid at an injection pressure determined by the controller, and where the output parameter is one of temperature and mass flow rate. The controller includes a first control device configured to: receive a target parameter value; receive a measured parameter value from the cryo-delivery system; determine a first difference between the target parameter value and the measured parameter value; and determine an injection pressure target signal based on the first difference that drives the first difference toward zero. The controller also includes a second control device configured to: receive the injection pressure target signal from the first control device; receive a measured injection pressure from an output of the second control device; determine a second difference between the injection pressure target signal and the measured injection pressure; and determine a valve control signal based on the second difference that drives the second difference toward zero.

According to this aspect, in some embodiments, the first control device includes a proportional integral derivative (PID) device having parallel branches, each branch configured to determine a term of a relationship between the first difference and the injection pressure target signal. In some embodiments, the second control device includes a proportional integral derivative (PID) device having parallel branches, each branch configured to determine a term of a relationship between the second difference and the valve control signal. In some embodiments, the controller further includes a switch to connect and disconnect the injection pressure target signal from an input to the second control device. In some embodiments, the controller further includes circuitry to deactivate the first control device during an initialization period during which the injection pressure target signal is disconnected from the input to the second control device.

The details of one or more aspects of the disclosure are set forth in the accompanying drawings and the description below. Other features, objects, and advantages of the techniques described in this disclosure will be apparent from the description and drawings, and from the claims.

BRIEF DESCRIPTION OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention and explain various principles and advantages of those embodiments.

Figure 1:
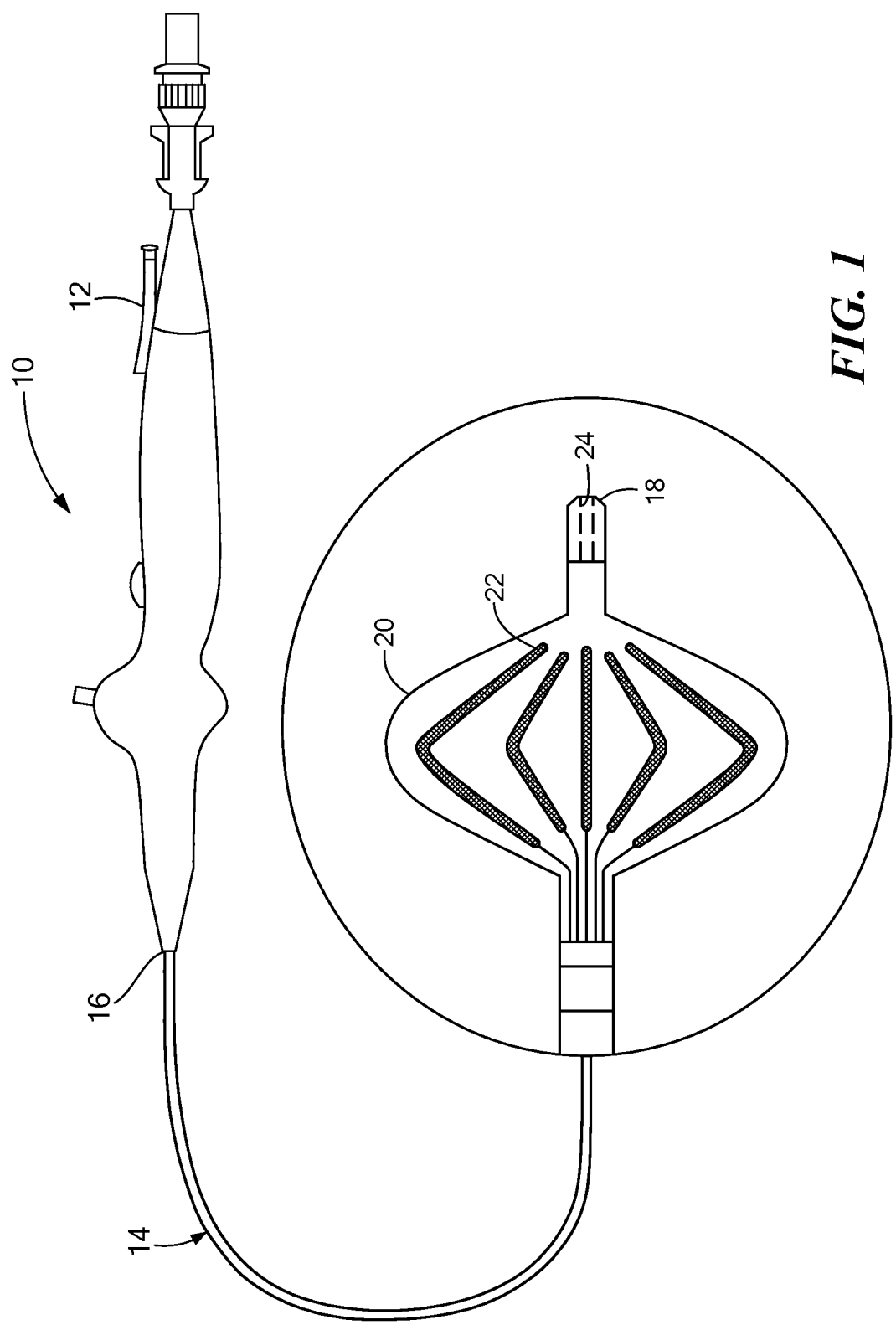
FIG. 1 is a diagram of a known cryogenic catheter device.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments presented herein.

The apparatus and method components have been represented where appropriate by conventional symbols in the drawings, showing only those specific details that are pertinent to understanding the embodiments so as not to obscure the disclosure with details that will be readily apparent to those of ordinary skill in the art having the benefit of the description herein. Like numbers refer to like elements throughout the description.

DETAILED DESCRIPTION

Before any embodiments are explained in detail, it is to be understood that the disclosure is not limited in its application to the details of construction and the arrangement of components set forth in the following description or illustrated in the following drawings. The embodiments presented herein may be practiced or carried out in various ways.

As used herein, relational terms, such as "first" and "second," "top" and "bottom," and the like, may be used solely to distinguish one entity or element from another entity or element without necessarily requiring or implying any physical or logical relationship or order between such entities or elements. The terminology used herein is for the purpose of describing particular embodiments only and is not intended to be limiting of the concepts described herein. As used herein, the singular forms "a," "an," and "the" are intended to include the plural forms as well, unless the context clearly indicates otherwise. It will be further understood that the terms "comprises," "comprising," "includes," and/or "including" when used herein, specify the presence of stated features, integers, steps, operations, elements, and/or components, but do not preclude the presence or addition of one or more other features, integers, steps, operations, elements, components, and/or groups thereof.

Figure 2:
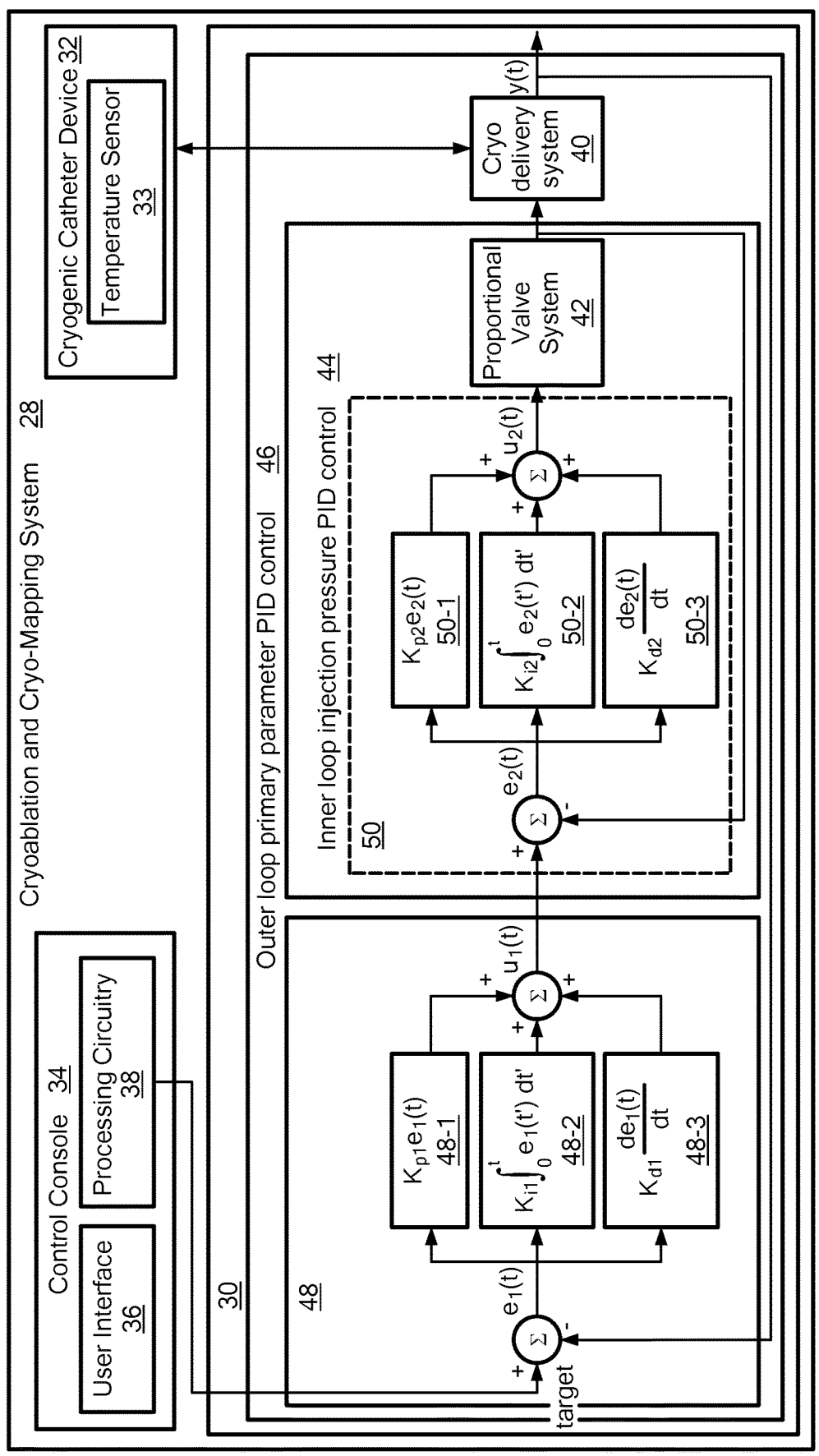
FIG. 2 is a block diagram of a cryoablation and cryo-mapping system according to some embodiments.

Referring again to the drawing figures where like elements have like reference numerals, FIG. 2 illustrates a cryoablation and cryo-mapping system 28 which includes a feedback control system 30 configured to control the injection pressure of fluid delivered to a cryogenic catheter device 32 in order to control a temperature at a tip 24 of the cryogenic catheter device 32 for cryo-mapping. The feedback control system 30 may be configured to control a mass flow rate of fluid delivered to the cryogenic catheter device 32 for cryo-ablation. The cryogenic catheter device 32 may include some or all of the components of the cryogenic catheter device 10. Conversely, the cryogenic catheter device 32 may have additional components not included in the conventional cryogenic catheter device 10. The cryoablation and cryo-mapping system 28 also includes a control console 34 configured to control the cryogenic catheter device 32. The control console 34 has a user interface 36 and processing circuitry 38. For example, the control console 34 may be a computer, the user interface 36 may include a mouse, keyboard and video monitor, and the processing circuitry 38 may include a processor configure to execute software to perform the various functions ascribed herein to the control console 34 and/or its components. The control console 34 enables an operator of the cryogenic catheter device 32 to set a temperature, injection pressure, mass flow rate and/or other settings to be used by the processing circuitry 38 to perform the functions herein attributed to the processing circuitry 38. The control console 34 is discussed in more detail below.

The feedback control system 30 includes a cryo-delivery system 40, a proportional valve system 42 controlled by an inner loop injection pressure proportional integral derivative (PID) controller (hereafter referred to as the inner loop PID controller 44) and an outer loop primary parameter PID controller (hereafter referred to as the outer loop PID controller 46). The proportional valve system 42 controls an injection pressure by controlling a valve through which fluid flows from a fluid source into the elongated body 14 to the distal end 18. The feedback control system 30 is shown in FIG. 2 as being separate from the processing circuitry 38 and the cryogenic catheter device 32. In alternative embodiments, at least some components of the feedback control system may be implemented by the processing circuitry 38. In some embodiments, the cryogenic catheter device 32 may include a temperature sensor 33 to sense a temperature at a distal end of the cryogenic catheter device 32.

A purpose of the feedback control system 30 is to maintain a set temperature and/or injection pressure more accurately and consistently over time. The temperature at the thermal tip 24 may be related to the injection pressure according to a known mathematical relationship that relates temperature to injection pressure. Thus, for cryo-ablation, the feedback control system 30 may maintain a set mass flow rate based on a type of the cryogenic catheter device 32. For cryo-mapping, the feedback control system 30 may maintain a set catheter tip temperature.

The output y(t) of the outer loop PID controller 46 is the primary parameter to be controlled by the feedback control system 30. The primary parameter to be controlled may be temperature, as sensed by the temperature sensor 33 or fluid mass flow rate, for example. The outer loop PID controller 46 has a first PID device 48 and the inner loop PID controller 44 has a second PID device 50. The inner loop PID controller 44 controls the injection pressure to be set by the proportional valve system 42.

The outer loop PID controller 46 output, y(t), is sought to be maintained at a constant value during a time of a mapping procedure or an ablation procedure. If the primary parameter to be controlled is temperature, for example, a target signal input to the feedback control system 30 may be a target temperature setting set by the operator of the cryogenic catheter device 32. In some applications, it is desirable to maintain a first temperature during cryo-mapping and a second temperature during cryoablation. For example, a cryo-mapping temperature may be −30 degrees centigrade (C.) and a cryoablation temperature may be −70 to −80 degrees C. The warmer temperature for cryo-mapping may be such that effects upon the tissue caused by the transfer of heat from the tissue to the cold fluid within the cryogenic catheter device 32 are reversible. In contrast, temperatures may be selected for cryoablation that cause irreversible altering of the cell structure of the tissue.

An example of the first PID device 48 may have three parallel branches 48-1, 48-2 and 48-3. Each of these branches receives an outer loop error signal $e_1(t)$ and simultaneously computes one of three terms that are summed together to produce an injection pressure target signal to the second PID device 50 of the inner loop PID controller 44.

This outer loop error signal $e_1(t)$ is a difference between the output $y(t)$ of the outer loop PID controller 46 and the target signal. The target signal may be a mass flow rate that is based at least in part on a type of the cryogenic catheter device 32 connected to the control console 34. Alternatively, the target signal may be a temperature set by the operator.

In operation, the outer loop PID controller 46 operates to be constantly driving the error signal $e_1(t)$ toward zero. By driving the error signal $e_1(t)$ toward zero, the actual value of the output parameter (temperature or mass flow rate of $N_2O$, for example, represented by $y(t)$ is driven toward the desired value of the output parameter (the temperature or mass flow rate). The target mass flow rate input to the outer loop PID controller 46 may be based on the type of catheter connected to the control console 34. Each catheter type has a target mass flow rate for optimal ablation therapy performance. The operator may set a time of ablation and/or a mapping temperature via the control console 34.

The three terms computed by the three branches are a first constant gain times the error signal $e_1(t)$ (branch 48-1), a second constant gain times an integral of the error signal $e_1(t)$ (branch 48-2), and a third constant gain times a derivative of the error signal $e_1(t)$ (branch 48-3). The integral and derivative are with respect to time.

Each branch of the first PID device 48 performs a different mathematical operation, namely:

$$K_{p1} e_1(t) \quad \text{Branch 48-1}$$

$$K_{i1} \int_0^t e_1(t') dt' \quad \text{Branch 48-2}$$

$$K_{d1} \frac{d}{dt} e_1(t) \quad \text{Branch 48-3}$$

where each of the factors, K, are gain constants. These expressions, when summed together, gives a control signal $u_1(t)$ that represents an injection pressure target signal. The gain constants control the speed, overshoot and stability of the feedback control system 30. The first and second PID devices 48, 50 may be commercially available PID devices. The operations performed by the branches have been derived mathematically based on principles of control systems generally, and make the PID device applicable to a large number of control loop applications. Note that in some embodiments there may be fewer than three branches, or there may be three branches with only two of them actually used. For example, in some embodiments, only branches 48-1 and 48-2 are employed.

In some embodiments, the temperature setting input by the operator is input to the outer loop PID controller 46. In some embodiments, a target mass flow rate is input to the outer loop PID controller 46. Once a temperature is set by the operator of the cryogenic catheter device 32, the outer loop PID controller 46 operates to maintain that temperature by maintaining an injection pressure corresponding to that temperature.

The inner loop PID controller 44 controls the injection pressure determined by the proportional valve system 42. The second PID device 50 may have three parallel branches 50-1, 50-2 and 50-3. Each of these branches operates in the same way as a corresponding branch of the first PID device 48, but they operate on a second error signal. The second error signal $e_2(t)$ that is input to the branches of the second PID device 50 is a difference between the injection pressure target signal $u_1(t)$ from the output of the first PID device 48 of the outer loop PID controller 46 and an actual injection pressure signal from the output of the proportional valve system 42.

Within the second PID device 50, a difference between the injection pressure target signal $u_1(t)$ and the output of the proportional valve system 42 or the actual/measured injection pressure produces a second error signal $e_2(t)$, which is input to the three branches 50-1, 50-2 and 50-3. The output of these three branches are added to produce the valve system control signal $u_2(t)$. This signal is input to the proportional valve system 42 to control an opening of a valve through which fluid flows into the catheter elongated body 14 and to the distal end 18. The output of the proportional valve system 42 is injection pressure. The output of the cryo-delivery system 40 the mass flow rate for cryo-ablation or a temperature. In some embodiments, the output of the cryo-delivery system 40 may be a signal to drive a motor that drives a valve to control the injection pressure of fluid injected into the elongated body 14 of the cryogenic catheter device 32 by varying the opening of a valve of the cryo-delivery system 40.

When the operator of the cryogenic catheter device 32 initially sets an injection pressure or a temperature, or when a mass flow rate is initially input upon being determined based on the catheter type, the initial error signal $e_1(t)$ might be large, because the difference between the target signal and the output parameter $y(t)$ is large. In this case, the first PID device 48 will take more time to drive the error signal $e_1(t)$ to zero, and may actually overshoot and cause the error signal $e_1(t)$ to oscillate about zero for a short time. If the gain terms K, are set to values that are too large, the error signal $e_1(t)$ may be driven more rapidly toward zero, but will have a larger overshoot and the oscillations about zero will take more time to die down. On the other hand, if the gain terms K are not large enough, it may take too long to drive the error signal $e_1(t)$ to zero. In this case, when the temperature setting is changed by the operator, a substantial variance between the actual output $y(t)$ and the target signal will result.

To address this, when the cryogenic catheter device 32 is initialized, an input $u_1(t_o)$ to the inner loop PID controller 44 may be set to a non-zero value that may be experimentally determined to cause a faster rise time and settling time of the outer loop PID controller 46. In addition, a short delay may be introduced between a first time of initially receiving the initial input $u_1(t_o)$ and a later time of initiating operation of the outer loop PID controller 46. A more detailed account of the initialization process is given below with respect to the flowchart of FIG. 5.

Thus, when initializing the cryoablation and cryo-mapping system 28, in a first step, the input to the second PID device is switched from the output of the first PID device, $u_1(t)$, to an initial value $u_1(t_o)$. In a second step, the initial value $u_1(t_o)$ of the target injection pressure signal is input to the inner loop PID controller 44 starting at the initial time $t_o$. Then, the inner loop PID controller 44 is allowed to run while $u_1(t_o)$ is maintained at the input for a predetermined time to allow for the inner loop PID controller 44 to drive the second error signal $e_2(t)$ closer to zero. After the predetermined time has expired, the input of the initial signal $u_1(t_o)$ is removed, the output of the first PID device 48, $u_1(t)$, is input to the inner loop PID controller 44.

Figure 4:
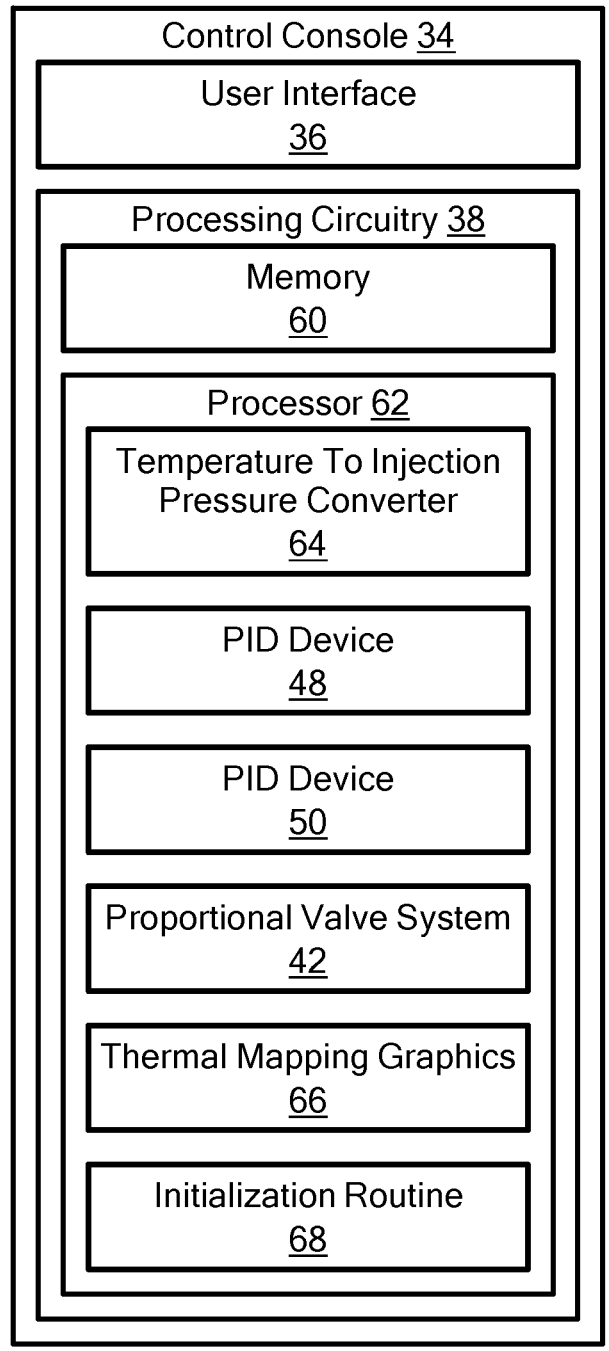
FIG. 4 is block diagram of a control console according to some embodiments.

In some embodiments, as can be appreciated by one skilled in the art, components of the cryoablation and cryo-mapping system 28, including the first PID device 48 and the second PID device 50 may be implemented in software. For example, in some embodiments, the first PID device 48 and the second PID device 50 are each implemented as a software module stored in a memory (for example, the memory 60 of the control console 34) and executed by an electronic processor (for example, the processor 62 as illustrated in FIG. 4). In such embodiments, as can be appreciated by one skilled in the art, the various signals described herein as being inputs to or outputs from the first PID device 48 and the second PID device 50 are digital signals routed in whole or in part by software (for example, by being passed as parameters or other data between software modules implementing the first PID device 48 and the second PID device 50).

Figure 3:
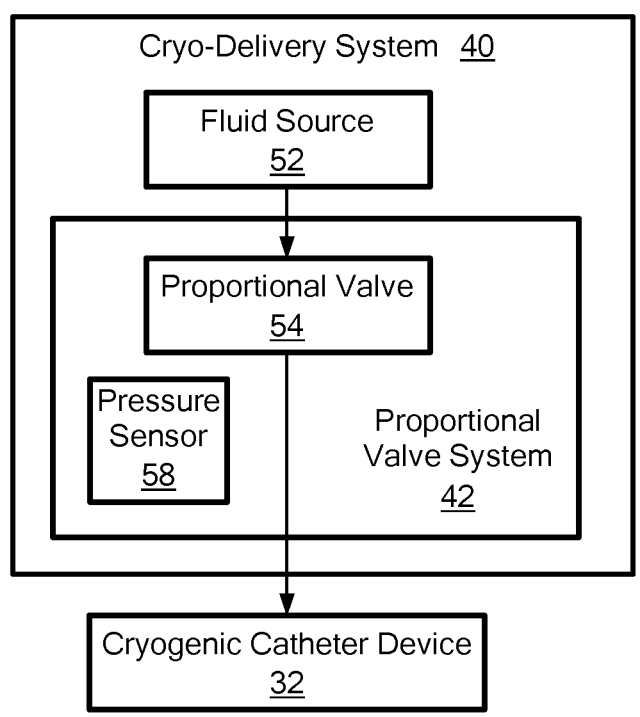
FIG. 3 is a block diagram of a cryo-delivery system according to some embodiments.

FIG. 3 is a block diagram of the cryo-delivery system 40. The cryo-delivery system 40 includes a fluid source 52 that is connected to a proportional valve 54 that is at least partially opened or closed under control of the output $u_2(t)$. The proportional valve 54 may be closed further to increase the injection pressure of the fluid exiting the proportional valve 54, whereas the proportional valve 54 may be opened further to lower the injection pressure of the fluid exiting the proportional valve 54. The injection pressure may be determined by a pressure sensor 58. The pressure sensor 58 may, in the alternative, be located in the cryogenic catheter device 32. In some embodiments, the proportional valve 54 and the pressure sensor 58 may be within the proportional valve system 42, which is within the cryo-delivery system 40 as shown in FIG. 3, or the proportional valve system 42 may be separate from the cryo-delivery system 40 as shown in FIG. 2.

FIG. 4 is a block diagram of the control console 34 which includes the user interface 36 and the processing circuitry 38. The user interface 36 enables the user to input a desired temperature, as well as other parameters. The user interface 36 also enables the user to visualize a thermal mapping of tissue as sensed by the temperature sensor 33 of the cryogenic catheter device 32. The processing circuitry 38 may be implemented to include a memory 60 and a processor 62. In some embodiments, the processor 62 may implement a temperature to injection pressure converter 64 which is configured to convert a temperature setting input by the operator to a corresponding injection pressure. In some embodiments, the processor 62 may also implement the first and/or second PID device 48, 50 and/or other components of the cryoablation and cryo-mapping system 28. The processor 62 may also include a thermal mapping graphics module 66 configured to generate a one, two or three dimensional display of the temperatures measured by the temperature sensor 33 of the cryogenic catheter device 32 as a function of position of the thermal tip 24. The processor 62 may also include an initialization routine 68 configured to initialize a value of the injection pressure target value $u_1(t)$ and to disconnect the outer loop PID controller output during an initialization time, and to reconnect the outer loop PID controller output upon expiration of the initialization time. Note that some of the functions herein attributable to the processing circuitry 38 may be performed in whole or in part by processing circuitry outside the control console 34. For example, switching circuitry may be located between the first and second PID devices 48, 50 and these devices may be separate from the control console 34. For example, the first and second PID devices 48, 50 may be located in proximity to or within the cryo-delivery system 40. The temperature to injection pressure converter 64, the first PID device 48, the second PID device 50, the proportional valve system 42, the thermal mapping graphics module 66, and the initialization routine 68 are illustrated in FIG. 4 within the bounds of the processor 62. As can be appreciated by one skilled in the art, some or all of the foregoing may be software routines (for example, stored in the memory 60, from where they are retrieved and executed by the processor 62) configured to perform operations as described herein.

Figure 5:
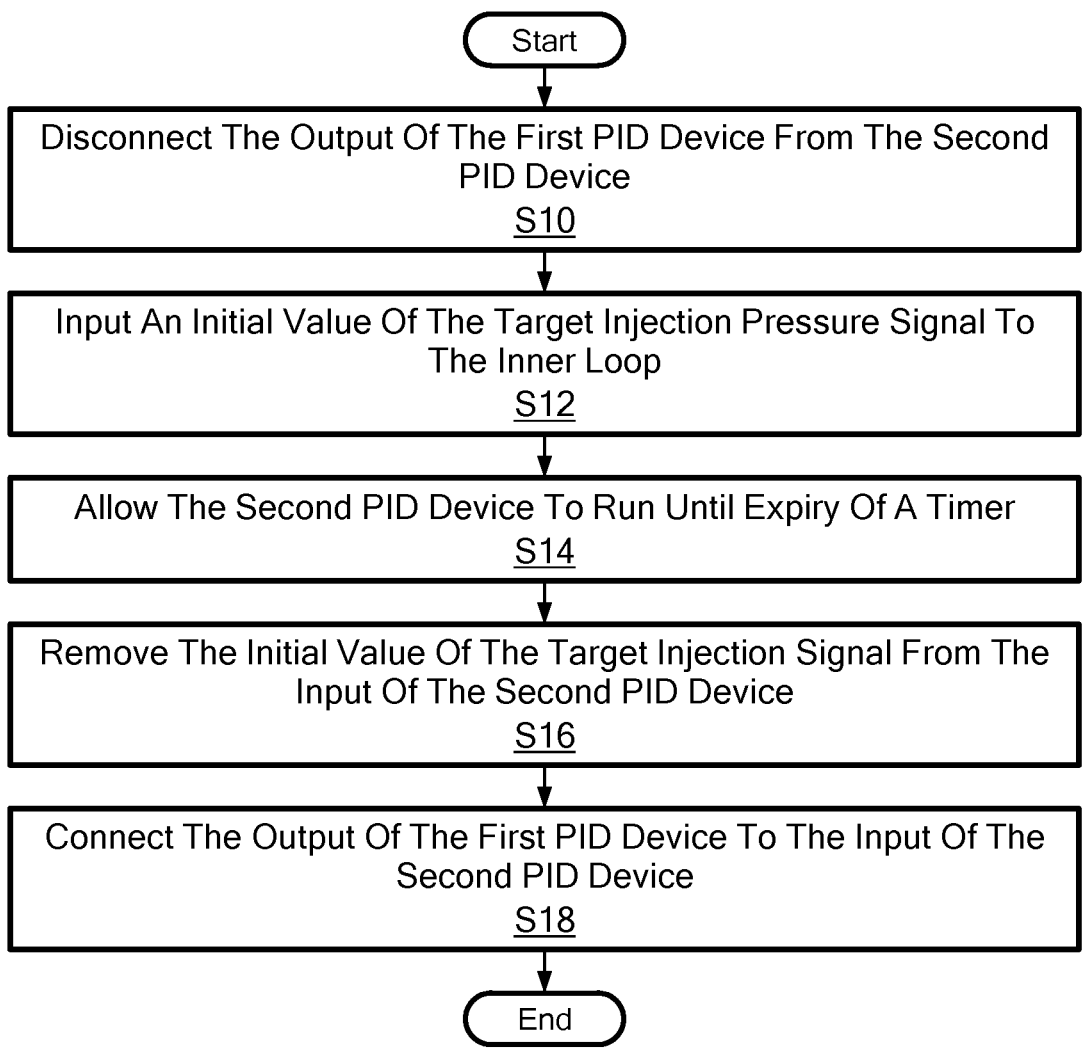
FIG. 5 is a flowchart of an example initialization process according to some embodiments.

FIG. 5 is a flowchart of an example process of initializing the cryoablation and cryo-mapping system 28. In a first step (Block S10), the connection between the output of the first PID device is broken, for example, by a switch (for example, implemented in hardware, software, or a combination of both). In a second step, an initial value $u_1(t_o)$ of the target injection pressure signal is input to the second PID device 50 starting at the initial time $t_o$ (Block S12). Then, the second PID device 50 is allowed to run while $u_1(t_o)$ is maintained at the input for a predetermined time to allow for the inner loop PID controller 44 to drive the second error signal $e_2(t)$ closer to zero (Block S14). After the predetermined time has expired, the input of the initial signal $u_1(t)$ is removed (Block S16) and the output of the first PID device 48, $u_1(t)$, is input to the inner loop PID controller 44 (Block S18).

Figure 6:
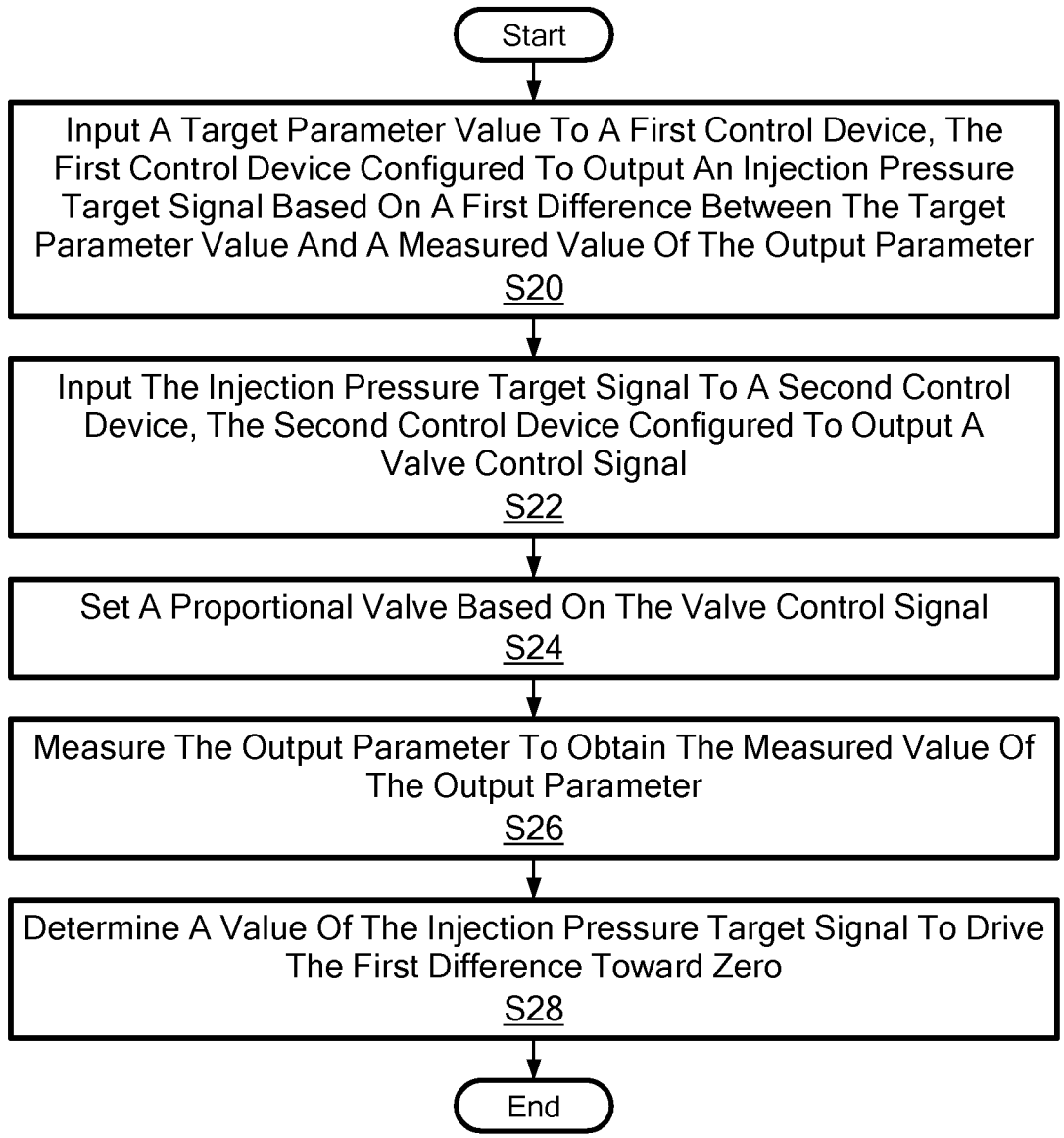
FIG. 6 is flowchart of an example output parameter control process according to some embodiments.

FIG. 6 is a flowchart of an example process for controlling an output parameter in a cryoablation and cryo-mapping system, the output parameter being one of temperature and mass flow rate. The process may be performed by the processing circuitry 38 and the feedback control system 30. The process includes inputting a target parameter value to a first control device, the first control device configured to output an injection pressure target signal based on a first difference between the target parameter value and a measured value of the output parameter (Block S20). The process also includes inputting the injection pressure target signal to a second control device, the second control device configured to output a valve control signal (Block S22). The process further includes setting a proportional valve based on the valve control signal (Block S24). The process also includes measuring the output parameter to obtain the measured value of the output parameter (Block S26). The process also includes determining a value of the injection pressure target signal to drive the first difference toward zero (Block S28).

Figure 7:
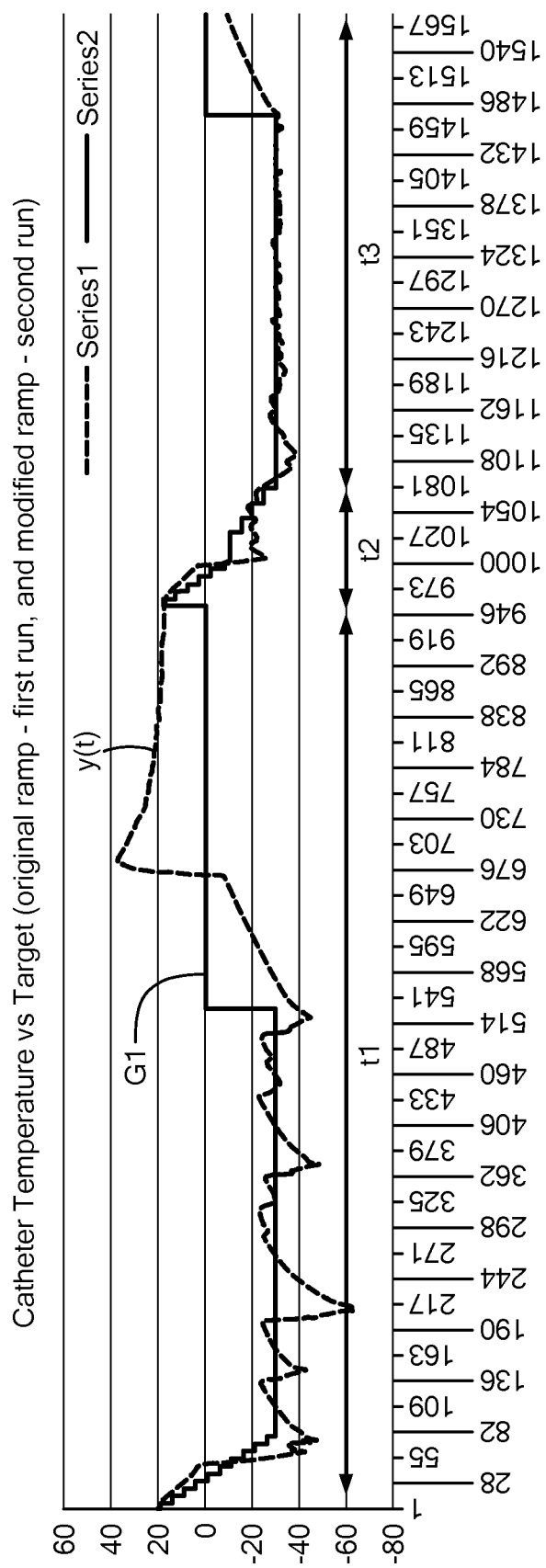
FIG. 7 is a graph of a target signal and a corresponding output parameter according to some embodiments.

FIG. 7 is a graph of a temperature setting G1 and the resultant temperature output $y(t)$ for a first time interval $t_1$ and a second time interval $t_2$. During the first time interval $t_1$, the resultant temperature $y(t)$ is determined. During a transition period $t_2$ between different settings of the output parameter, the processing circuitry 38 of the control console 34 increments the target signal between the different settings. During a time interval $t_3$, the resultant temperature $y(t)$ is determined by incrementally changing the target signal from a prior setting to a new setting. As can be seen, incrementally changing the target signal during the transition period $t_2$ between settings, the output $y(t)$ more accurately tracks the input target signal. In particular, during the transition period $t_2$, the step size of G1 is varied over time interval $t_2$ so that the output $y(t)$ does not fall below the value of G1 at the start of the time interval $t_3$ or does not fall as far below this value of G1 as would be the case with uniform step size, as shown at the beginning of time interval $t_1$. Thus, in some embodiments, the processing circuitry is configured to increment the target signal from a first setting to a second setting during a transition period.

In one aspect, the present disclosure provides a method of controlling an output parameter in a cryoablation and cryo-mapping system 28, the output parameter being one of temperature and mass flow rate. The method includes inputting a target parameter value to a first control device (for example, the first PID device 48), the first control device configured to output an injection pressure target signal based on a first difference between the target parameter value and a measured value of the output parameter. The method also includes inputting the injection pressure target signal to a second control device (for example, the second PID device 50), the second control device configured to output a valve control signal. The method further includes setting a position of an injection pressure valve based on the valve control signal. The method also includes measuring the output parameter to obtain the measured value of the output parameter and determining a value of the injection pressure target signal to drive the first difference toward zero.

According to this aspect, in some embodiments, the second control device is configured to drive a second difference between the injection pressure target signal and a measured injection pressure toward zero. In some embodiments, the first control device is implemented using a proportional integral derivative (PID) device having parallel branches, each branch configured to determine a term of a relationship between the first difference and the injection pressure target signal. In some embodiments, the second control device is implemented using a proportional integral derivative (PID) device having parallel branches, each branch configured to determine a term of a relationship between the second difference and the valve control signal. In some embodiments, the method further includes incrementing or decrementing the target parameter value during a transition period between inputting a first target parameter value and a second target parameter value, the incrementing or decrementing being according to a variable step size. In some embodiments, the method further includes ceasing incrementing or decrementing the target parameter value when the valve control signal reaches a maximum or minimum, respectively. In some embodiments, the method further includes inputting an initial injection pressure target signal determined to control an amount of overshoot of the valve control signal.

According to another aspect, a cryoablation and cryo-mapping system 28 configured to control an output parameter of a cryo-delivery system 40 is provided, where the output parameter is one of temperature and mass flow rate. The system includes a first control device configured to receive a target parameter value and a measured output parameter and to output an injection pressure target signal based on a first difference between the target parameter value and the measured output parameter. The system also includes a second control device configured to receive the injection pressure target signal and to output a valve control signal, the valve control signal being input to a proportional valve 54. The first control device determines a value of the injection pressure target signal to drive the first difference toward zero.

According to this aspect, in some embodiments, the second control device is configured to drive a second difference between the injection pressure target signal and a measured injection pressure signal toward zero. In some embodiments, the first control device is implemented using a proportional integral derivative (PID) device having parallel branches, each branch configured to determine a term of a relationship between the first difference and the injection pressure target signal. In some embodiments, the second control device is implemented using a proportional integral derivative (PID) device having parallel branches, each branch configured to determine a term of a relationship between the second difference and the valve control signal. In some embodiments, the system further includes processing circuitry configured to increment or decrement the target parameter value during a transition period between inputting a first target parameter value and a second target parameter value, the incrementing or decrementing being according to a variable step size. In some embodiments, the system further includes a cryogenic catheter device 32 configured to receive fluid from the cryo-delivery system 40 through the proportional valve 54. In some embodiments, the cryogenic catheter device 32 has a thermal tip 24 configured to sense a temperature of tissue contacted by the thermal tip 24. In some embodiments, the system 28 also includes a user interface 36 to display a thermal temperature map based on the temperature sensed by the thermal tip 24. In some embodiments, the system 28 also includes processing circuitry 38 configured to disconnect the injection pressure target signal output of the first control device from an input of the second control device, and to input an initial injection pressure target signal to the second control device during an initialization period. In some embodiments, the processing circuitry 38 is further configured to reconnect the injection pressure target signal output of the first control device to the input of the second control device.

According to yet another aspect, a controller 46 is configured to control an output parameter of a cryo-delivery system 40, where the cryo-delivery system 40 is configured to inject a fluid at an injection pressure determined by the controller 46, and where the output parameter is one of temperature and mass flow rate. The controller 46 includes a first control device configured to: receive a target parameter value; receive a measured parameter value from the cryo-delivery system; determine a first difference between the target parameter value and the measured parameter value; and determine an injection pressure target signal based on the first difference that drives the first difference toward zero. The controller 46 also includes a second control device configured to: receive the injection pressure target signal from the first control device; receive a measured injection pressure from an output of the second control device; determine a second difference between the injection pressure target signal and the measured injection pressure; and determine a valve control signal based on the second difference that drives the second difference toward zero.

According to this aspect, in some embodiments, the first control device includes a proportional integral derivative (PID) device having parallel branches, each branch configured to determine a term of a relationship between the first difference and the injection pressure target signal. In some embodiments, the second control device includes a proportional integral derivative (PID) device having parallel branches, each branch configured to determine a term of a relationship between the second difference and the valve control signal. In some embodiments, the controller 46 further includes a switch (for example, implemented using hardware circuitry or software) to connect and disconnect the injection pressure target signal from an input to the second control device. In some embodiments, the controller 46 further includes processing circuitry 38 to deactivate the first control device during an initialization period during which the injection pressure target signal is disconnected from the input to the second control device.

It should be understood that various aspects disclosed herein may be combined in different combinations than the combinations specifically presented in the description and accompanying drawings. It should also be understood that, depending on the example, certain acts or events of any of the processes or methods described herein may be performed in a different sequence, may be added, merged, or left out altogether (e.g., all described acts or events may not be necessary to carry out the techniques). In addition, while certain aspects of this disclosure are described as being performed by a single module or unit for purposes of clarity, it should be understood that the techniques of this disclosure may be performed by a combination of units or modules associated with, for example, a medical device.

It should also be noted that a plurality of hardware and software-based devices, as well as a plurality of different structural components may be used to implement aspects of the embodiments disclosed herein. In addition, it should be understood that embodiments may include hardware, software, and electronic components or modules that, for purposes of discussion, may be illustrated and described as if the majority of the components were implemented solely in hardware. However, one of ordinary skill in the art, and based on a reading of this detailed description, would recognize that, in at least one embodiment, the electronics-based aspects may be implemented in software (e.g., stored on non-transitory computer-readable medium) executable by one or more electronic processors (e.g., microprocessors). As such, it should be noted that a plurality of hardware and software-based devices, as well as a plurality of different structural components may be utilized to implement the embodiments presented herein. For example, "control units" and "controllers" described in the specification can include one or more processors, one or more memory modules including non-transitory computer-readable medium, one or more input/output interfaces, and various connections (e.g., a system bus) connecting the components. Computer-readable media may include non-transitory computer-readable media, which corresponds to a tangible medium, for example, data storage media (e.g., RAM, ROM, EEPROM, flash memory, or any other medium that can be used to store desired program code in the form of instructions or data structures and that can be accessed by a computer).

Instructions may be executed by one or more processors, for example, one or more digital signal processors (DSPs), general purpose microprocessors, application specific integrated circuits (ASICs), field programmable logic arrays (FPGAs), or other equivalent integrated or discrete logic circuitry. Accordingly, the term "processor" as used herein may refer to any of the foregoing structure or any other physical structure suitable for implementation of the described techniques. Also, the techniques could be fully implemented in one or more circuits or logic elements.

Various features and advantages of some embodiments are set forth in the following claims.

What is claimed is:

1. A method of controlling an output parameter in a cryoablation and cryo-mapping system, the output parameter being one of temperature and mass flow rate, the method comprising:
    inputting a target parameter value to a first control device, the first control device configured to output an injection pressure target signal based on a first difference between the target parameter value and a measured value of the output parameter;
    disconnecting the injection pressure target signal from a second control device;
    inputting an initial injection pressure target signal to the second control device for a predetermined time;
    reconnecting the injection pressure target signal to the second control device;
    inputting the injection pressure target signal to the second control device, the second control device configured to output a valve control signal;
    setting a position of an injection pressure valve based on the valve control signal;
    measuring the output parameter to obtain the measured value of the output parameter; and
    determining a value of the injection pressure target signal to drive the first difference toward zero.

2. The method of claim 1, wherein the second control device is configured to drive a second difference between the injection pressure target signal and a measured injection pressure toward zero.

3. The method of claim 2, wherein the first control device is implemented using a proportional integral derivative (PID) device having parallel branches, each branch receiving an error signal and simultaneously computing a term of a relationship between the first difference and the injection pressure target signal, the terms summing to produce the injection pressure target signal.

4. The method of claim 2, wherein the second control device is implemented using a proportional integral derivative (PID) device having parallel branches, each branch receiving an error signal and simultaneously computing a term of a relationship between the second difference and the valve control signal, the terms summing to produce the valve control signal.

5. The method of claim 1, further comprising incrementing or decrementing the target parameter value during a transition period between inputting a first target parameter value and a second target parameter value, the incrementing or decrementing being according to a variable step size.

6. The method of claim 1, further comprising ceasing incrementing or decrementing the injection pressure target signal when the valve control signal reaches a maximum or minimum, respectively.

7. The method of claim 1, wherein inputting the initial injection pressure target signal includes inputting an initial injection pressure target signal determined to control an amount of overshoot of the output parameter.

8. A cryoablation and cryo-mapping system configured to control an output parameter of a cryo-delivery system, the output parameter being one of temperature and mass flow rate the system comprising:
    a first control device configured to:
    receive a target parameter value and a measured output parameter;
    output an injection pressure target signal based on a first difference between the target parameter value and the measured output parameter; and
    determine a value of the injection pressure target signal to drive the first difference toward zero;
    a second control device configured to receive the injection pressure target signal and to output a valve control signal, the valve control signal being input to a proportional valve; and
    processing circuitry configured to:
    disconnect the injection pressure target signal output of the first control device from an input of the second control device; and
    input an initial injection pressure target signal to the second control device during an initialization period.

9. The system of claim 8, wherein the second control device is configured to drive a second difference between the injection pressure target signal and a measured injection pressure signal toward zero.

10. The system of claim 9, wherein the first control device is implemented using a proportional integral derivative (PID) device having parallel branches, each branch receiving an error signal and simultaneously computing a term of a relationship between the first difference and the injection pressure target signal, the terms summing to produce the injection pressure target signal.

11. The system of claim 9, wherein the second control device is implemented using a proportional integral derivative (PID) device having parallel branches, each branch receiving an error signal and simultaneously computing a term of a relationship between the second difference and the valve control signal, the terms summing to produce the valve control signal.

12. The system of claim 8, further comprising processing circuitry configured to increment or decrement the target parameter value during a transition period between inputting a first target parameter value and a second target parameter value, the incrementing or decrementing being according to a variable step size.

13. The system of claim 8, further comprising a cryogenic catheter device configured to receive fluid from the cryo-delivery system through the injection pressure valve.

14. The system of claim 13, wherein the cryogenic catheter device has a thermal tip including a temperature sensor configured to sense a temperature of tissue contacted by the thermal tip.

15. The system of claim 14, further comprising a user interface to display a thermal temperature map based on the temperature sensed by the thermal tip.

16. The system of claim 8, wherein the processing circuitry is further configured to reconnect the injection pressure target signal output of the first control device to the input of the second control device.

17. A controller configured to control an output parameter of a cryo-delivery system, the cryo-delivery system configured to inject a fluid at an injection pressure determined by the controller, the output parameter being one of temperature and mass flow rate, the controller comprising:
 a first control device configured to:
  receive a target parameter value;
  receive a measured parameter value from the cryo-delivery system;
  determine a first difference between the target parameter value and the measured parameter value; and
  determine an injection pressure target signal based on the first difference that drives the first difference toward zero; and
 a second control device configured to:
  receive the injection pressure target signal from the first control device;
  receive a measured injection pressure from an output of the second control device;
  determine a second difference between the injection pressure target signal and the measured injection pressure; and
  determine a valve control signal based on the second difference that drives the second difference toward zero; and
 a switch to connect and disconnect the injection pressure target signal from an input to the second control device.

18. The controller of claim 17, wherein the first control device includes a proportional integral derivative (PID) device having parallel branches, each branch receiving an error signal and simultaneously computing a term of a relationship between the first difference and the injection pressure target signal, the terms summing to produce the injection pressure target signal.

19. The controller of claim 17, wherein the second control device includes a proportional integral derivative (PID) device having parallel branches, each branch receiving an error signal and simultaneously computing a term of a relationship between the second difference and the valve control signal, the terms summing to produce the valve control signal.

20. The controller of claim 18, further comprising circuitry to deactivate the first control device during an initialization period during which the injection pressure target signal is disconnected from the input to the second control device.

* * * * *